Aug. 18, 1942.   G. A. BARDET ET AL   2,293,586
CAN TESTING MACHINE
Filed Oct. 23, 1939   5 Sheets-Sheet 1

INVENTOR
GEORGE A. BARDET.
GEORGE V. BARDET.
Cook & Robinson
ATTORNEY

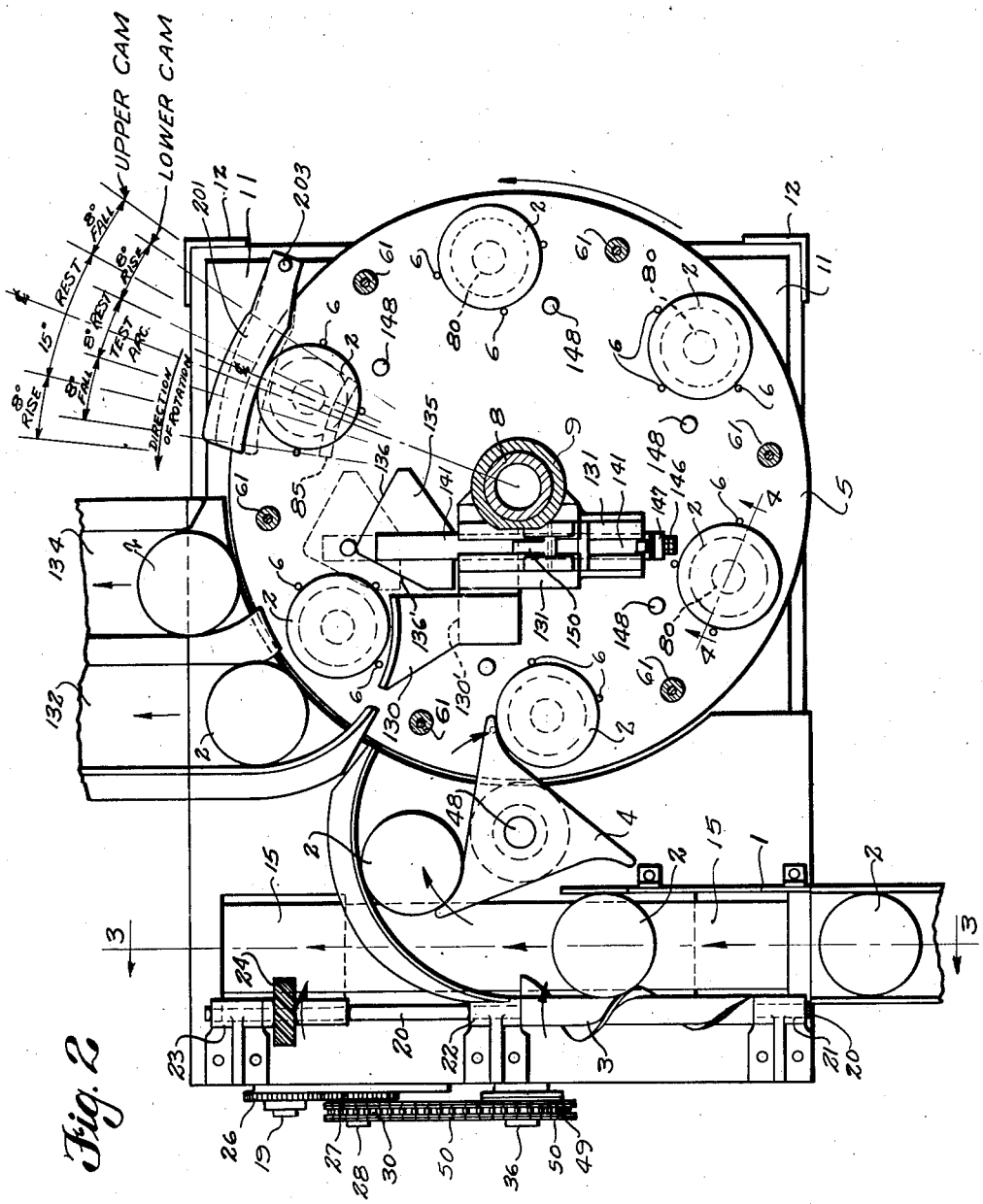

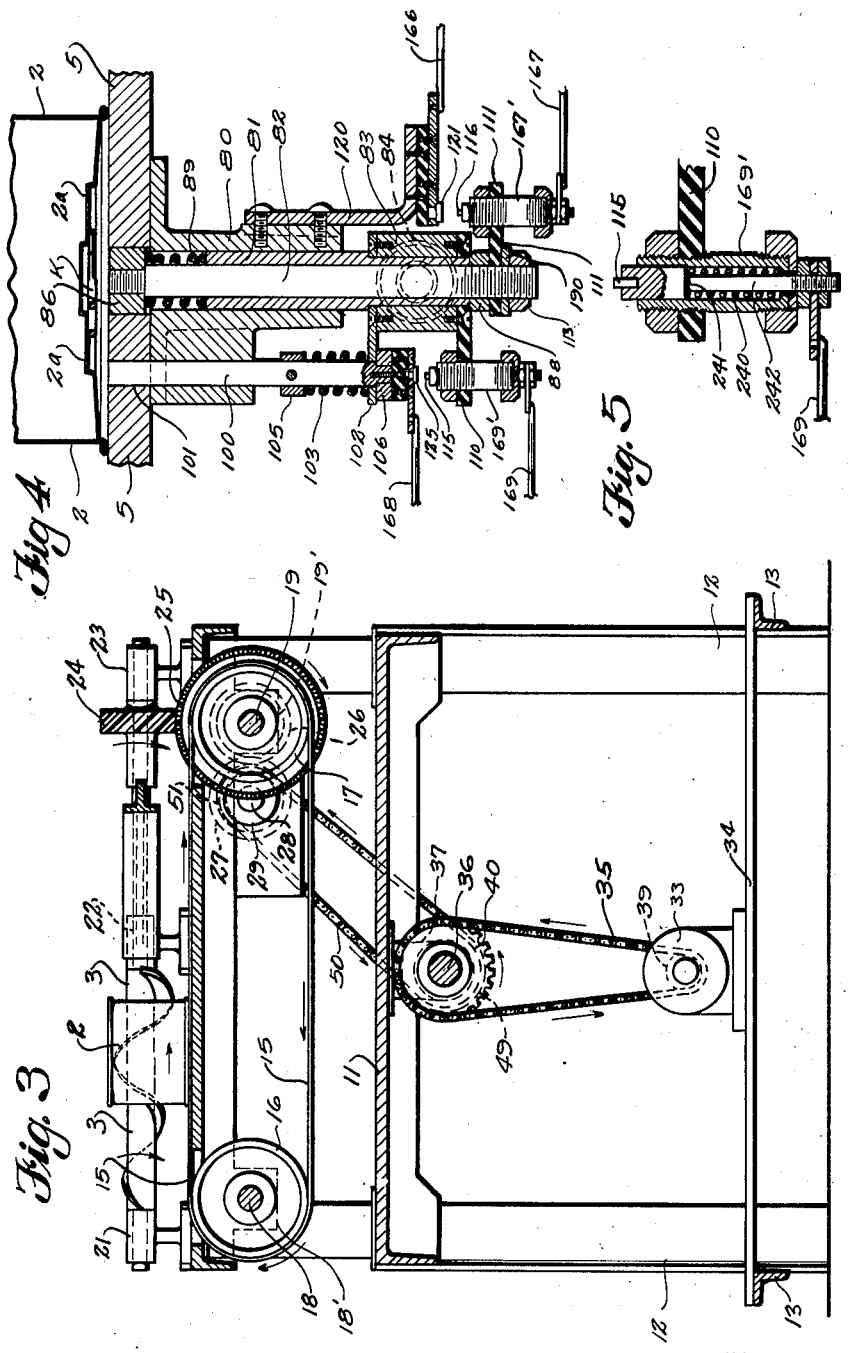

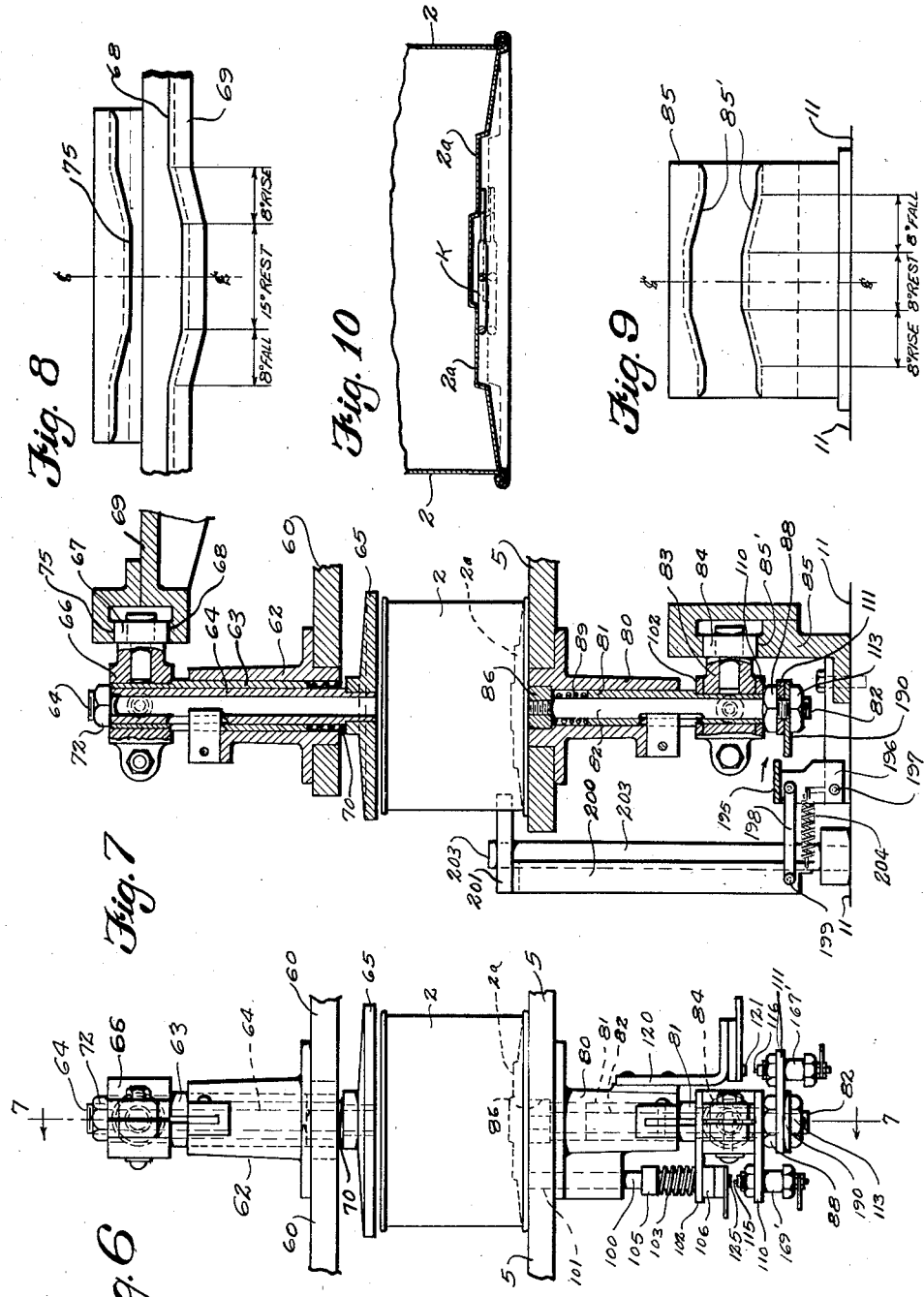

Aug. 18, 1942.　　　G. A. BARDET ET AL　　　2,293,586
CAN TESTING MACHINE
Filed Oct. 23, 1939　　　5 Sheets-Sheet 5
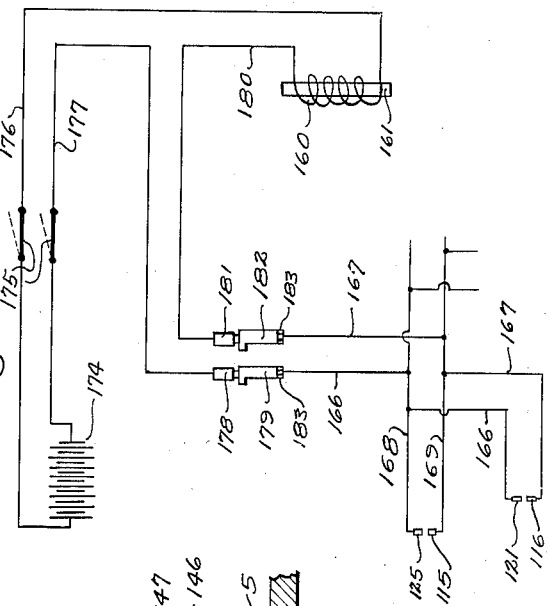
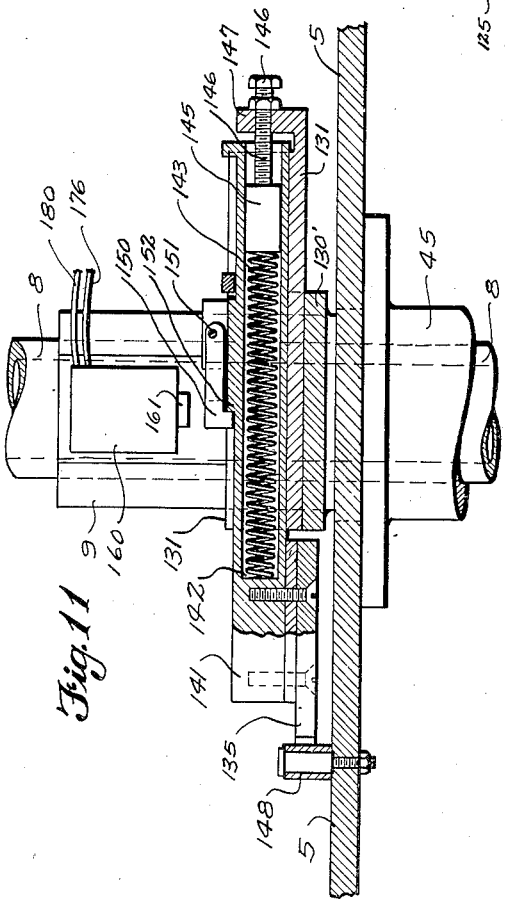
INVENTOR.
GEORGE A. BARDET.
GEORGE V. BARDET.
BY Cook & Robinson
ATTORNEY.

Patented Aug. 18, 1942

2,293,586

UNITED STATES PATENT OFFICE 2,293,586

CAN TESTING MACHINE

George A. Bardet and George V. Bardet, Berkeley, Calif., assignors to M. J. B. Company, San Francisco, Calif., a corporation of Delaware Application October 23, 1939, Serial No. 300,760

6 Claims. (Cl. 209—88)

This invention relates to machines designed for the testing of sealed cans or containers, such, for example, as those now extensively used for the packing of coffee; and the principal object of the invention is to provide a machine of novel construction and fully automatic in operation, whereby tin cans, after being sealed in vacuum, may rapidly, and in succession, be tested for the purpose of identifying those which are not adequately vacuumized and also those cans to which keys have not been applied.

It is also an object of this invention to provide a machine of the above character that is equipped with means whereby any can which lacks either the required vacuum or which does not have a key attached thereto, will be segregated and discharged from the machine separately from those which have the required vacuum and also have the keys attached thereto.

More specifically stated, the present invention resides in the provision of a can testing machine of the character above stated comprising a continuously rotating turret onto which cans to be tested are adapted to be successively placed under control of a timing screw for the testing operations, and whereby the cans will be carried to points of discharge from the machine, and having associated with the turret, devices for effecting the above mentioned tests on the cans while they are being carried from the point of reception to the points of discharge; said testing devices being arranged to control the functional operations of an ejection device for the separation of those cans not passing the tests from those which are properly vacuumized and also properly equipped with keys and which pass the tests.

Other objects of the invention reside in the details of construction of parts of the machine, and in their relationship, combination and mode of operation, as will hereinafter be fully described.

In accomplishing the above, and other objects of the invention, I have provided the improved details of construction, the preferred forms of which are illustrated in the accompanying drawings, wherein—

Fig. 2 is a horizontal section of the machine, taken in the plane of the line 2—2 in Fig. 1.

Fig. 3 is a transverse, vertical section through the machine, taken on the line 3—3 in Fig. 2.

Fig. 4 is a vertical, sectional view taken on the line 4—4 in Fig. 2, showing details of the testing devices at one of the can stations of the turret.

Fig. 5 is a sectional detail of one of the circuit closing contacts of the testing mechanism.

Fig. 6 is an elevation of a part of the machine showing a can as disposed therein for testing.

Fig. 7 is a sectional detail on line 7—7 in Fig. 6, particularly illustrating the cam actuated parts at one of the can stations of the machine.

Fig. 8 is an elevation of the upper cam track whereby movements of the can clamping pads are effected and controlled.

Fig. 9 is an elevation of the lower cam for controlling movement of the test making devices at one of the can stations.

Fig. 10 is a fragmental sectional view of the lower end portion of a can, showing the location of a key thereon and illustrating the inward flexing of the can end wall by reason of vacuum in the can.

Fig. 11 is an enlarged, longitudinal sectional view of the can ejector mechanism.

Fig. 12 is a diagrammatic illustration of the circuit connections and contacts for controlling the operation of the ejector.

Figure 1:
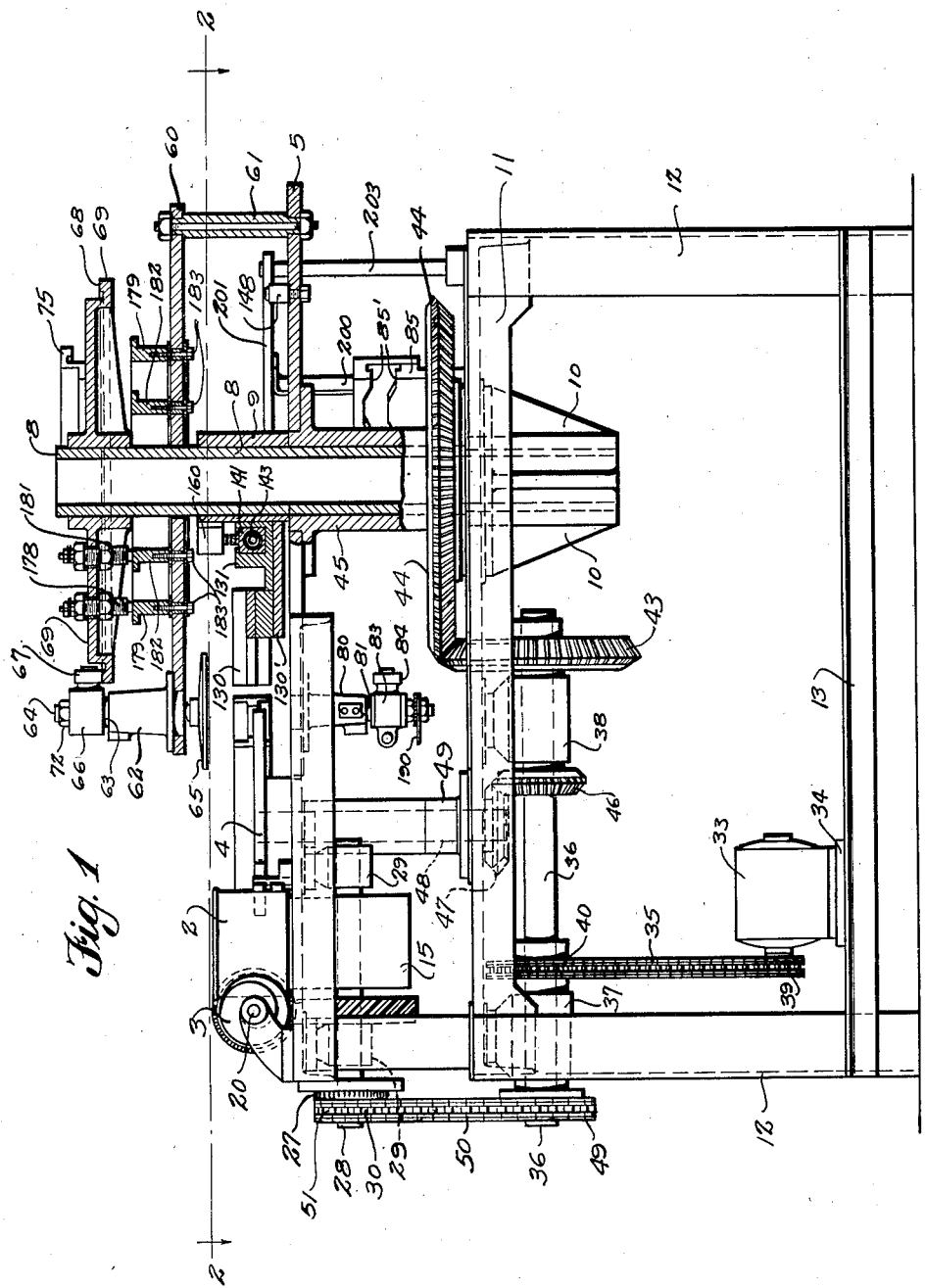
Fig. 1 is an end elevation of a can testing machine embodying the present invention; a part of the upper structure of the turret being shown in vertical cross-section for purpose of better illustration.

Briefly described, the present machine comprises conventional means whereby cans of like size may be delivered successively, and in proper spacing, into the can stations of a horizontal, rotating turret, to be carried by the turret through an arc of approximately 300° before being discharged. Can clamping pads are mounted on the turret directly above the can receiving stations, and a cam is arranged to actuate the pads against the cans after the latter are delivered onto the turret, to hold them solidly in place for the testing operations, and then to raise the pads after the tests have been made, to free the cans for ejection from the machine.

It will be explained that each can, on entering the machine, is presumed to be vacuumized, and also is presumed to have a key attached to an end wall; the key being applied to that end of the can which, for the test, is the lower end, and it will be understood that all keys are attached to the can ends to lie across the center thereof. It is further understood that the present test for extent of vacuum in the can, takes into consideration that the can end walls will be drawn inwardly to a more or less extent because of the existence of vacuum in the can, and that a condition of absence of vacuum is disclosed by the unflexed condition of an end.

Associated with the turret, at each of the several can stations, are two testing feelers, adapted to be lifted up against the lower can end wall; the extent of movement of one feeler being determined by the extent to which the wall is inwardly flexed and the extent of movement of the other is dependent on the presence of or the absence of a key from position on the can. Should the key be absent from a can, a farther movement of the latter mentioned feeler will be permitted than if the key was in place to stop it, and this farther movement of the feeler effects the closing of an electrical circuit. Likewise, should the can wall not be flexed inwardly to a predetermined extent, as is the case when the can is inadequately vacuumized, it will limit the travel of the other feeler and by so doing, effect the closing of the electrical circuit. The closing of the electrical circuit by either device will cause the actuation of an ejector device to eject the can which caused the circuit to be closed, into a different discharge chute than that into which the cans passing the test are delivered.

Referring now more in detail to the drawings—

1 designates a can guideway into which cans 2 are received and along which they are advanced and spaced by a rotating timing and feed screw 3, to be picked up from the screw by a horizontally disposed, rotatably driven star wheel 4, and delivered thereby onto a rotating turret 5. The turret is equipped at regularly spaced intervals about its axis with sets of short studs 6 projecting upwardly therefrom and defining the individual stations into which the cans are received as advanced by the star wheel.

The turret 5 is supported for rotation about a vertical central shaft 8 of tubular structure which, as noted best in Fig. 1, is fixed at its lower end in a supporting casting 10 which, in turn, is solidly fixed in the frame structure of the machine. The frame, as noted best in Figs. 1 and 3, comprises a rectangular, table-like structure 11, equipped and supported at the four corners by vertical legs 12, which are joined, across their lower ends, by connecting bars 13 to insure rigidity.

The cans 2 are here shown as being advanced into the guideway 1 and to the feed screw 3 upon an endless belt conveyor 15. This might be of the link type, or of the flat belt type, as here shown, or of other kind. The belt travels in the direction indicated by the arrow thereon in Fig. 2, and passes about supporting wheels 16 and 17, which are mounted, respectively, on horizontal shafts 18 and 19 rotatably supported in the frame structure in bearings 18' and 19'. The feed screw 3 extends parallel with the conveyor belt and along one side of the guideway 1, and is mounted by its driving shaft 20. The shaft is rotatably supported in bearings 21, 22 and 23. Fixed on one end of the shaft 20 is a driving gear 24, and this is operatively in mesh with a gear 25 that is fixed on the belt driving shaft 19. Shaft 19, in turn, has a driving gear 26 meshing with a gear 27 that is fixed on a short, horizontally disposed driven shaft 28, rotatably mounted in a bearing 29 and equipped at its outer end with a sprocket wheel 30 through which it is driven, as noted in Fig. 2.

As will be observed by reference to Figs. 1 and 3, an electric motor 33 is mounted in the lower part of the frame structure on a base plate 34 and there is a sprocket chain belt 35 providing a driving connection from the motor with a horizontal shaft 36 carried in the frame structure by bearings 37 and 38, as noted in Fig. 1; the sprocket chain belt passing about sprocket wheels 39 and 40 mounted respectively on the drive shaft of the motor and on the shaft 36. At its inner end, the shaft 36 mounts a bevel gear 43 that drives a relatively large bevel gear wheel 44 that is fixed on the mounting hub portion 45 of the turret 5, and there is also a bevel gear 46 fixed on shaft 36 in driving mesh with a bevel gear 47 that is fixed on the lower end of a vertical shaft 48 that mounts the star wheel 4 at its upper end. The shaft 48 is rotatably contained in a bearing 49 fixed on the frame structure.

At the outer end of shaft 36 is a sprocket wheel 49 and a sprocket chain belt 50 operates thereover and about a sprocket wheel 51 fixed on the shaft 28 to drive the latter and incidentally to drive the feed screw and can conveyor belt by the connections previously described.

Without going into a detailed explanation of the ratios of the driving gearing, it will be stated, in brief, that the ratios are such that the conveyor belt 15 carries the cans promiscuously to the feed screw which spaces them and times their delivery to the pockets of the star wheel, and the latter is timed with reference to the rate of rotation of the turret 5 so that the cans will be properly located thereby in the can stations of the turret as they are successively brought into position to receive the cans.

Referring now more particularly to Fig. 1, it will be observed that there is a circular plate, or disk, 60 fixedly mounted on the turret 5, a distance above it somewhat more than the height of the cans to be tested, and this is spaced and also fixed to the turret by a plurality of spacing posts 61.

Mounted on the disk 60, directly above each can station of the turret, is a vertical and tubular guide bearing 62, and in each bearing, a tubular sleeve 63 is slidably keyed for vertical movement. Each sleeve 63 contains a tubular shaft 64, slidably keyed in the sleeve for limited vertical travel, and on the lower end of each shaft 64, a disk or pad 65 is horizontally fixed, and adapted, upon downward movement of the shaft 64, to be seated flatly against the upper end flange of the can that may be located thereunder for testing, to hold the can solidly and against movement on the turret while being tested.

Clamped or otherwise fixed on the upper end of each sleeve 63 is a bracket 66 mounting thereon a roller 67 adapted for travel upon a circular cam track 68 that is formed about the periphery of a stationary plate, or disk, 69 that is rigidly fixed on the upper end of the shaft 8. The cam track 68 is so designed that incident to the rollers 67 passing therealong with rotation of the turret, each pad 65, which will be in raised position as in Fig. 6 on reception of a can thereunder, will be immediately moved down against the upper end flanges of the cans, and will be retained in its lowered position until after the can testing operations have taken place.

As will be noted in Fig. 7, each pad has a yieldable connection with the actuating sleeve. This is formed by a coiled spring 70 that is located about the lower end portion of the shaft 64 and presses at its opposite ends, respectively, against the hub of the pad and the lower end of the bearing sleeve 63 which slidably contains the shaft. The spring 70 operates to resist relative slippage between the sleeve and shaft, but will yield in the event there should be discrepancy in the height of the can and the normal travel of the sleeve under influence of the cam. The downward travel of the shaft 64 relative to the sleeve containing it, is limited by a nut 72 threaded onto the upper end of the shaft to engage the upper end of the sleeve, as noted in Fig. 7.

While the cans are being carried on the turret through that interval where it is desired they be held firmly against upward displacement for testing, the cam rollers 67 pass beneath a cam rail 75 as will be observed in Fig. 8, designed to put pressure on the pad that will insure the can against displacement. The location of this rail will be noted in Fig. 1.

Mounted on the under side of the turret 5 and directly below each can station thereon, is a tubular guide bearing 80, and in each bearing, a sleeve 81 is slidably contained for limited longitudinal travel, and slidably contained in each sleeve 81 is a shaft 82. On the lower end of each sleeve 81, a bracket 83 is fixedly mounted, and each bracket carries a cam roller 84 adapted to engage within the cam slot 85' of an arcuate cam 85 that is fixed in the machine to lift the sleeves to effect the testing operations, as presently understood. Fixed on the upper end of the shaft 82, at each can station, as noted in Fig. 7, is a head or nut 86, normally disposed flush with or slightly below the top surface of the turret, as noted. On the lower end of the shaft 82, a nut 88 is threaded to normally engage with the lower end of the sleeve 81, where it is yieldingly held seated by the pressure of a coiled spring 89 that is located in the bearing 80 and interposed between the upper end of the sleeve 81 and the nut 86.

By reference to Fig. 10, it will be understood that the can end wall 2a is countersunk and therefore will be spaced somewhat above the level of the surface of the turret. Without vacuum in the can, this end wall will assume the dotted line position in which it is shown, while with proper vacuum in the can, the end wall will be drawn inwardly to the full line position, as will be understood.

It is also to be noted that the key k for opening the can is attached to the can end wall so as to extend across the center thereof and consequently at this position to be engaged by the nut 86 for one of the tests when the testing devices are actuated.

The design of the cam track 85' is such, and the cam so located, that when each can reaches the testing arc, which has been so designated in Fig. 2, the sleeve 81 directly below that can, will be shifted upwardly by the action of the corresponding cam roller 84 passing up the cam incline, and will thereby cause the corresponding shaft 82 to move accordingly until the nut or head 86 at the upper end of the shaft 82 engages the key or the lower end wall applied to the can. The cam is so designed that the nut 86 will engage the key before the sleeve has reached its full upward travel. However, if no key is present on the can, the shaft 82 will move up until the head 86 engages the can end wall.

Referring now to Fig. 4, it will be noted that in each of the mounting bearings 80, spaced slightly from, but parallel to the shaft 82, is a second feeler shaft 100 that is slidably movable in its mounting and has its upper end extending into a passage 101 through the turret 5, flush with or slightly below the top surface thereof, so that the upper end of this shaft 100 can be engaged with the can end wall. The lower end of the shaft 100 extends slidably through a laterally projecting arm 102 that is fixed to the lower end portion of the sleeve 81, just above the bracket 83. A coiled spring 103 encircles the lower end portion of shaft 100 and bears against the bracket arm 102 and against a collar 105 fixed on the shaft, and a nut 106 on the lower end of the shaft 100 limits the upward movement of the shaft 100 relative to bracket 102. The parts, as here illustrated, disclose that the shaft 100 will move upwardly and downwardly with the actuation of sleeve 81 by bracket 83, and will move upwardly, when a test is made, until engaged with the lower end wall of the can being tested. Thus, as each can is being carried by the turret through the testing arc, the bracket 83 of the testing mechanism corresponding to that can, will be actuated upwardly by cam 85. This upward actuation of the bracket 83 causes the feeler shafts 82 and 100 to shift upwardly. The nut 86 on shaft 82 is thereby lifted until it engages with the attached key, or, if no key is in place, until it engages the can end wall, regardless of whether or not the wall is inwardly flexed. The shaft 100 moves up to engage the can end wall. The extent of movement of the shafts 82 and 100, at each can station, determines whether or not the can will be ejected, and the operation of ejecting the cans is effected by an ejector device, the construction, operation and control of which will now be described.

In Fig. 4, I have shown a horizontal arm 110 fixed to the lower end surface of the bracket 83 and extending in the direction of the arm 102 and directly below the latter. Also, there is an arm 111 fixed to the lower end of shaft 82 and extending opposite to the direction of arm 110, and is held between the nut 88 and a second nut 113 threaded onto the lower end of the shaft 82.

At their outer ends, the arms 110 and 111, respectively, mount electrical contacts 115 and 116 which move upwardly or downwardly with the sleeve 81 and shaft 82 respectively, under control of the cam roller 84 and cam 85.

Fixed to each bearing 80, as noted in Fig. 6, is a bracket 120 carrying an electrical contact 121. This is adapted to be engaged by the contact 116 only in the event that the shaft 82 is permitted to raise to a sufficient height; this being possible when a test is made only in the event the key is absent from the can being tested. Likewise, there is an electrical contact 125 on the lower end of shaft 100, adapted to be engaged by the contact 115 when the latter is carried upwardly with the sleeve 81 during a testing operation, provided however that the shaft 100 is stopped in its upward travel before the sleeve reaches its upper extent of travel under influence of the cam, such as would be the case in the event a can being tested lacked vacuum sufficient to flex its end wall inwardly.

In the lifting of the sleeve 81 for a test, should either set of the complemental contacts 115 and 125, or 116 and 121, be engaged, a circuit will be closed to energize the can ejection mechanism for removal of the can. This will now be described.

Referring now to Fig. 2, it will be observed than the cans 2, as disposed on the turret 5, after they have passed through the testing arc, will be brought into contact with a stationary ejection guide shoe 130 and will be diverted thereby into a discharge chute 132. The guide shoe is mounted by a bracket 130' which, in turn, is fixedly mounted on the shaft 8. It is to be understood, however, that any can that does not pass the key or vacuum test, in passing through the testing arc, will be automatically ejected, prior to their reaching the ejection shoe 130, into a delivery chute 134, and thereby segregated from those cans which properly pass the tests.

The bracket 130' mounts thereon a housing 131 disposed just above the turret 5. Slidably mounted in this housing, for movement between retracted and extended positions, and directed toward the entrance into the delivery chute 134, is a horizontally disposed bar 141. Fixedly mounted on the outer end of this bar is an ejection shoe 135 having an inclined edge surface 136 adapted, when the bar 141 is in its extended position, as shown in dotted lines in Fig. 2, to act as an abutment and guide whereby a can moving in contact therewith will be diverted into the chute 134. However, when the bar 141 is retracted, the shoe 135 will be out of the path of travel of the can, and it will continue in its travel, to be diverted by shoe 130 into the chute 132.

The bar 141, as seen in Fig. 11, has a longitudinal bore 142 formed in its inner end portion in which a coiled spring 143 is contained. This spring is retained under compression and operates, upon release of the bar from its retracted position, to actuate it to its extended position. The spring in this case bears at one end against the base of the bore in the bar, and at its other end, against an abutment block 145 that is adjustably mounted, and is held in position by a bolt 146 that is threaded through an end lug 147 fixed to the bar supporting housing.

Assuming that the bar 141 has been actuated to its extended position, as indicated in dotted lines in Fig. 2, the can that caused its actuation is advanced by the rotating turret into engagement with the inclined edge 136 of the shoe and will be diverted thereby into the chute 134. Immediately following the ejection of the can, the bar will be moved back to its retracted position by means of a stud 148 that is fixed in the turret at a proper location to engage with the inclined edge surface 136 of the ejection shoe, and by reason of travel therealong, to push the bar inwardly against the pressure of the ejection spring. It is to be noted in Fig. 2 that such studs are provided between each of the cam stations.

It is to be observed also that the ejection shoe has an inclined edge surface 136' opposite the surface 136, and this engages with the studs 148 on the actuation of the shoe outwardly and thus eases this action so as to overcome shock or wear.

When the bar 141 has been pushed back to its retracted position by the action of the contact stud 148, it will then be retained against being extended until it is again released by the action of the testing mechanism. The means for locking the bar in its retracted position, as noted best in Fig. 11, comprises a latch 150 which longitudinally overlies the bar 141 and which is pivotally mounted on the housing 131 by a pivot 151 and is provided with a hook at its free end that is adapted to engage with a retaining lug 152 on the bar. When the hook is so engaged with the lug, the bar will be held in its retracted position, as illustrated in full lines in Fig. 2.

Supported from a collar 9 fixed to the shaft 8, directly over the latch bar 150, is an electromagnet 160 having a core 161 that extends to a position closely overlying, but spaced slightly from the movable end of the latch so that, incident to the magnet being energized, the latch will be magnetically lifted, thus to disengage it from the lug 152 of the ejection bar and free the latter for movement to its extended position.

The magnet in this case is electrically connected in a circuit as diagrammatically illustrated in Fig. 12. Normally, the electric circuit to the magnet is open, but will be closed incident to the closing of an electrical connection between any of the sets of coacting contacts 116—121 or 115—125 that are associated with the turret at the various can stations.

In order to obtain a better understanding of the circuit connections, reference is directed to Fig. 12 wherein 174 designates a source of electrical current under control of a main switch 175 and from which switch a circuit wire 176 leads to one side of the magnet and another circuit wire 177 leads to and is connected with a brush 178 which is mounted in the cam plate 69 to engage with a contact ring 179 fixed upon the disk 60, coaxially of the shaft 8. The other side of the magnet is connected by circuit wire 180 with another brush 181, mounted on the cam plate and which engages in circuit closing contact with a ring 182 also fixed upon the disk 60, coaxially of shaft 8. The contact rings 179 and 182 are insulated from the disk 60 and are fixed in place by bolts 183. These bolts are extended upwardly through the disk 60, and are also insulated therefrom and serve, as later described, as circuit connections.

Each set of contacts 116 and 121 has circuit connections as at 166 and 167 with the bolts 183, thus to be electrically connected respectively to the contact rings 179 and 182. Also, the contacts 115 and 125 have circuit connections 168 and 169 with the wires 166 and 167 respectively. Thus, when any set of coacting contacts are engaged in a can testing operation at any can station of the turret, an electric circuit will be closed through the electro-magnet and it will be energized, thus to lift the latch 150 and permit the actuation of the ejection bar to its extended position for the automatic ejection of the can which caused the closing of the circuit.

It is apparent that, in the event no can should be present at a can station of the turret when that station passed through the testing arc, there would be a functional operation of the ejecting device unless some means were provided to prevent it. To prevent such operation when no can is in place, I have mounted on the lower end of each shaft 82 a laterally directed plate 190. These plates are fixed to the lower ends of their respective shafts between the lateral arms 111 and the nuts 113, and extend radially with reference to the axis of rotation of the turret as will be noted in Fig. 7. Extending through an arc corresponding to that of the testing cam but lying outside thereof, is a horizontal plate 195, disposed in such position that the outer end of the arm 190 will just pass thereunder. The plate 195 is equipped at its ends with supporting legs 196 which are pivotally mounted at their lower ends on the frame structure, as at 197, to permit a slight outward and inward swinging adjustment of the plate 195. Also connected with the plate 195 is one end of a link 198 which is pivotally fixed at its other end, as at 199, to a downwardly depending post 200, fixed to a horizontally disposed shoe 201 which, as noted in Fig. 7, is supported slightly above the level of the turret 5 and in position to be engaged by each of the cans advanced by the turret through the testing arc, and will be held by the cans at its outer position. This shoe 201, as noted in Fig. 2, is pivotally supported from the frame structure by a post 203, and a spring connection as at 204 made with the frame, will hold the plate 195 in the path of the vertical travel of the arms 190. By referring to Fig. 7, it will be understood that if no can is in position on a station of the rotating turret, the shoe 201 will be held inwardly by the spring 204 as that station passes through the testing arc, and the plate 195 will thereby be swung inwardly to such position that it will be engaged by the arm 190 and thus the testing or feeler shaft 82 at that can station will not be permitted to rise with the sleeve 81 and consequently no circuit can be closed by devices at that station to cause a functional operation of the can ejecting device.

It is not believed necessary to describe in detail the construction of the various contact elements. However, it will be mentioned, and attention is directed to the detailed showing of parts in Figs. 4 and 5, wherein the contacts and supports are suitably insulated so that no circuit will be shorted through the mechanisms. Furthermore, it will be observed by reference to Fig. 5, that those contacts that have vertical movement under influence of the cam, are yieldingly mounted so that they may accommodate themselves to the movements effected by the cams without causing any damage thereto by reason of overtravel. Note that the contacts 115 and 116 are slidably contained in sleeves 169' and 167' and that coiled springs 240 act against shoulders 241 on the contact mounting bolts 242 and against the closed lower ends of the sleeves to yieldingly retain the contacts in extended position.

Assuming that the machine is so constructed, and that cans are being delivered thereto in the usual manner, the operation of the machine for testing the cans is as follows:

The cans, as received, are spaced apart and delivered, in proper timing, to the star wheel 4 by the feed screw 3. The star wheel operates to advance the cans successively into the can testing stations on the rotating turret. Each can, upon being placed in position, is subsequently clamped in place by the downward action of the corresponding pad 65 operating under influence of the stationary cam 68. The turret carries the cans in succession through the testing arc and while each can is passing through this arc, the testing mechanism therefor is actuated by the engagement of the cam roller 84 with the cam 85. The cam and roller cause the sleeve 81 to be lifted and thereby effects the upward actuation of the shafts 82 and 100. In the event that the can is not properly vacuumized, the lower end wall thereof will not be inwardly flexed and therefore the shaft 100 will be stopped in its upward travel and the continuing upward travel of the bracket 83 and contact 115 will cause the latter to be brought up against the contact 125, thereby closing the electric circuit to the magnet, which, upon being thus energized, releases the latch 150 from the ejection bar and permits the functional actuation of the latter for ejection of the defective can.

If the can is properly vacuumized, the end wall will be inwardly flexed and the shaft 100 will rise to a location where the contact 125 is held in the clear of the contact 115, and thus no ejection operation will be effected.

In the event that no key should be present on the can, the shaft 82 will be permitted to move upwardly to an extent that will cause the closing of a circuit between the coacting contacts 116 and 121, thus to energize the magnet and effect the release of the ejection bar. The can that has thus caused the actuation of the ejector device, will be brought into contact with the ejection shoe on the bar and thereby diverted into the ejection chute 134. If the ejection device is not energized or actuated, the can will be diverted into the ejection chute 132. Following the ejection of a can by the ejection device, the ejection bar will be reset by the action of a resetting stud 86.

If a key is present on the can, the shaft 82 will be retained against upward travel to an extent for closing the circuit connections to the magnet, and no ejection operation will take place.

Having thus described our invention, what we claim as new therein and desire to secure by Letters Patent is:

1. A can testing machine, comprising a horizontal rotary turret having a plurality of can stations thereon, means at one side of the turret for successively placing cans in the stations to be carried thereby through a testing arc to a point of discharge, a can ejection device, latch means normally holding the ejection device in a retracted position, means for automatically actuating the ejection device to extended, functional position when released, means movable with the turret and corresponding to each can station for resetting the ejection device following the ejection of each can, means adapted to be electrically energized to effect the release of the latch means from the ejection device, a feeler mounted in the turret at each of the can test stations, means at each station and movable with the turret through a definite interval for actuation of the feeler into testing position as the latter is carried through the testing arc, and means coacting with the said feelers and their moving devices for closing an electric circuit to the said electrical device.

2. In a vacuum deficiency testing machine for sealed cans having flexible end closures, comprising a horizontal rotary turret having a plurality of can stations thereon, means at one side of the turret for placing cans in the stations as the turret rotates, to be carried in succession thereby through a testing arc, a stationary means beyond the testing arc for the diverting of tested cans from the turret, an ejector device mounted for movement from retracted, non-functional position to extended, functional position, a latch normally holding the ejection device in its retracted position, a spring for actuating the device to its functional position when released by the latch, an electro-magnet associated with the latch and adapted, when energized, to disengage it from the ejection device, a normally open electric circuit for the electro-magnet, a feeler mounted on the turret at each can station, means for moving the feelers into contact with the can end closures as the cans are successively carried through the testing arc and means coacting with the feelers, for closing a circuit to the electro-magnet to release the ejector device, when the testing travel of a feeler is less than a predetermined amount.

3. In a vacuum deficiency testing machine for sealed cans having flexible end closures, comprising a rotary turret having a plurality of can stations thereon, means at one side of the turret for placing cans in the stations as the turret rotates, to be carried in succession thereby through a testing arc, stationary means beyond the testing arc for the diverting of tested cans from the turret, an ejector device mounted for movement from retracted, non-functional position to extended, functional position, a latch normally holding the ejection device in its retracted position, a spring for actuating the device to its functional position when released by the latch, an electro-magnet associated with the latch and adapted, when energized, to disengage it from the ejection device, a normally open electric circuit for the electro-magnet, a feeler mounted on the turret at each can station, means for moving the feelers into contact with the can end closures as the cans are successively carried through the testing arc and means co-acting with the feelers, for closing a circuit to the electro-magnet to release the ejector device, when the testing travel of a feeler is less than a predetermined amount, and means associated with each can station and moving with the turret and operable against the ejection device for re-setting it immediately after the ejection of a can thereby.

4. In a vacuum deficiency testing machine for sealed cans having flexible end closures, comprising a rotary turret having a plurality of can stations thereon, means at one side of the turret for placing cans in the stations as the turret rotates, to be carried in succession thereby through a testing arc, stationary guide means beyond the testing arc for the diverting of tested cans from the turret, an ejector device mounted for movement from retracted, non-functional position to extended, functional position, a latch normally holding the ejection device in its retracted position, a spring for actuating the device to its functional position when released by the latch, an electro-magnet associated with the latch and adapted, when energized, to disengage it from the ejection device, a normally open electric circuit for the electro-magnet, a stationary cam, a movably mounted bracket at each testing station adapted to be moved through a definite interval by the cam in passing through the testing arc, a feeler yieldably mounted by each bracket to move therewith into contact with the can closure, and electrical contacts carried by the feeler and its bracket and adapted to be engaged to close the circuit to the electro-magnet incident to the feeler being stopped in its travel by contacting a closure lacking a predetermined inward flexure and means on the turret associated with each can station to engage the ejector when in an extended position to move it to retracted position.

5. In a vacuum deficiency testing machine for sealed cans having flexible end closures, comprising a rotary turret having a plurality of can stations thereon, means at one side of the turret for placing cans in the stations as the turret rotates, to be carried in succession thereby through a testing arc, stationary means beyond the testing arc for causing the diverting of tested cans from the turret, an ejector device mounted for movement from retracted, non-functional position to extended, functional position, and having a cam surface a latch normally holding the ejection device in its retracted position, a spring for actuating the device to its functional position to locate the cam surface in the path of moving cans to effect their ejection from the turret when released by the latch, an electro-magnet associated with the latch and adapted, when energized, to disengage it from the ejection device, a normally open electric circuit for the electro-magnet, a stationary cam, a movably mounted bracket at each testing station adapted to be moved through a definite interval by the cam in passing through the testing arc, a feeler yieldably mounted by each bracket to move therewith into contact with the can closure, and electrical contacts carried by the feeler and its bracket and adapted to be engaged to close the circuit to the electro-magnet incident to the feeler being stopped in its travel by contacting a closure lacking a predetermined inward flexure and studs on the turret corresponding to each can station for engaging the cam surface of the ejection device to automatically restore it to retracted position.

6. In a testing machine for key equipped cans, a moving carrier for conveying cans through a testing interval, an ejection device, means adapted to be electrically energized, to effect operation of the ejection device, and a testing mechanism comprising a sleeve mounted by the can carrier for movement lengthwise toward the can end as the can is carried through the testing interval, a stationary cam, a cam follower mounted on the sleeve to effect its movement, a rod yieldably mounted in the sleeve and extending therebeyond and adapted to be stopped in travel by engagement with a key when the sleeve is moved toward the can, a normally open circuit for the electrical means, a stationary contact in the circuit and a contact movable with the sleeve to engage the stationary contact if the travel of the rod is not checked by contact with a key.

GEORGE A. BARDET.
GEO. V. BARDET.